June 25, 1929.   A. E. GREENE   1,718,817
CABLE CONNECTER
Filed April 1, 1925
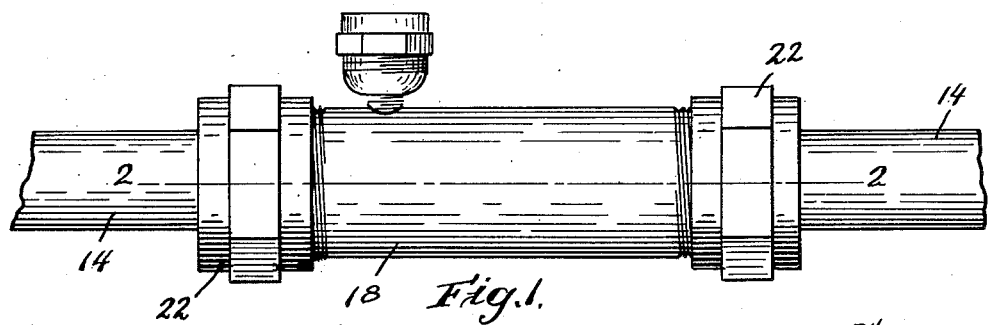
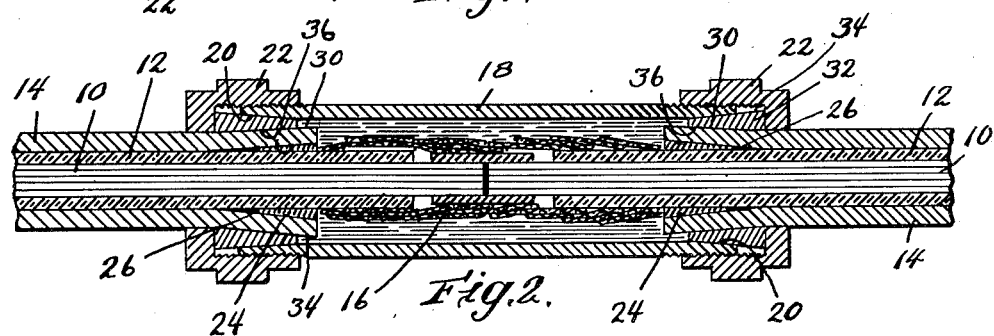
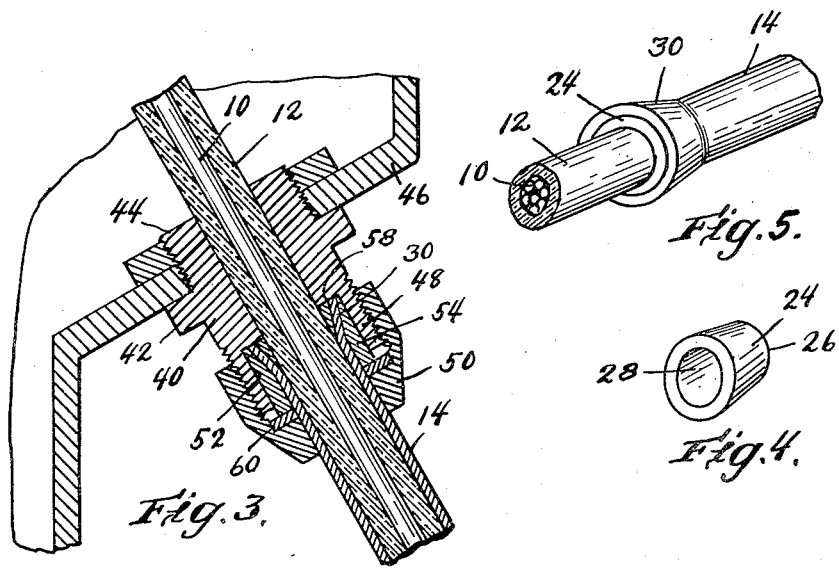
Inventor.
Austin E. Greene
by
Greenwood
atty Patented June 25, 1929.

1,718,817

UNITED STATES PATENT OFFICE.

AUSTIN E. GREENE, OF MEDFORD HILLSIDE, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

CABLE CONNECTER.

Application filed April 1, 1925. Serial No. 20,003.

This invention relates to metallic-sheathed, flexible, insulated electric conductors or cables and has for an object to provide means to connect together in a secure and mechanically firm and also water tight manner the two parts of a cable about and in enclosing relation with a splice therebetween; or to connect the metallic-sheath of the cable in the aforesaid manner to a support, as a switch or transformer casing through which the cable is passed.

A further object is generally to improve the construction of cable connecters.

Fig. 1 is a side elevation of the invention expressly adapted to connect together two portions of the metallic sheaths of a cable about a splice therebetween.

Fig. 2 is a sectional view along lines 2—2 of Fig. 1.

Fig. 3 is a longitudinal section through a further modified form of the invention especially adapted to connect a cable to the wall of the casing.

Fig. 4 is a perspective view of a wedge-ring which is adapted to protect the insulation of the cable against the compression forces of the clamping and sealing members.

Fig. 5 is a perspective view of a cable-end with the wedge-ring inserted between the metallic sheath and the insulation of the conductor.

The cable with which this invention is associated comprises a central electric conductor 10 which may be either solid, or stranded as here shown, and enclosed in an insulating sheath 12, which sheath is usually of some relatively soft rubber compound. The conductor and its insulating sheath is enclosed in a metallic sheath 14 which is usually composed of a relatively soft and ductile metal, as lead, to seal the conductor and its insulating sheath from the weather and also to protect and support it against mechanical stresses.

In the modification of the invention shown in Figs. 1 and 2, the connecter is applied over the splice 16 between two portions of the cable-conductor and is adapted to enclose and insulate the splice and also mechanically to connect the metallic sheath of the two portions of the cable on each side of the splice.

As shown in Figs. 1 and 2 the connecter comprises a connecter-body as a short section of metal tubing 18 which is exteriorly screw-threaded at each end and preferably is formed with the interiorly tapered portion 20 at each end. Compression collars 22 are disposed over the metallic-sheath of the cable ends and are removably screw-threaded on the ends of enclosing tubes 18 and, in combination with other means, are adapted to exert a pressure on the cable-sheaths by which to clamp them firmly to the connecter and seal the splice.

Means are provided to protect the insulating sheath 12 against the clamping pressure, and also to provide a tapered seat on the cable sheath against which the clamping pressure is exerted. Said means includes a wedge-ring 24, Fig. 4, which ring has its outer peripheral portion tapered to a thin edge 26 and is provided with a passage 28 therethrough in which the insulating sheath 12 of the cable is adapted to be received. The wedge-ring is inserted between the metallic sheath 14 and the insulating sheath as shown in Fig. 2, and serves to expand outwardly the end of the metallic sheath whereby to form a tapered seat 30 thereof as illustrated in Fig. 5.

A compression-ring 32 is disposed over the end of the cable sheath of the cable behind the tapered seat thereof. Preferably said compression-ring is formed with a tapered outer periphery 34 which is adapted to engage the internal taper 20 of the enclosing tube 18. Said compression-ring is also formed with an internal, tapered passage 36 which is conformed with and is adapted to engage the tapered seat 30 of the cable sheath. Both ends of the connecter shown in Figs. 1 and 2 are or may be identical in construction.

In securing the connecter to the cable shown in Fig. 2 both compression-collars 22 are adapted to be screwed-up together whereby to force the compression rings 32 strongly against the tapered seats 30 of the cable and also ultimately to seat the compression rings 32 into the tapered seats 20 of the tube 18. During the tightening operation the pressure of one compression ring 32 tending to move the cable axially of the tube 18 is resisted by the corresponding ring on the other end of the connecter, acting through the splice 16.

The rings 32 are adapted to be made of some relatively soft material as, for instance, an aluminum alloy which preferably is harder than the metallic sheath of the cable and softer than the material composing the enclosing tube 18. The wedge-rings 24 are adapted to be of some relatively hard and unyielding metal as for instance, some copper composition.

With the above construction a positive pressure is placed upon the metallic sheath of the cable and the line of contact is continuous about the cable sheath so that a water tight joint is made between the sheath and the connecter. The joint, furthermore, is mechanically strong and unlikely to become loose.

The wedge-ring 24 serves to receive the clamping pressure and supports the insulating sheath 12 of the cable against deformation and thereby possible break down of its insulating properties. The wedge-ring also serves to support the lead sheath rigidly against the clamping pressure whereby to prevent the gradual yielding of the ductile metal under compression.

The modification of the invention illustrated in Fig. 3 is adapted more particularly for transformer, switch, or the like, casings where the cable is brought into the casing and the sheath thereof is connected mechanically and also in a water tight manner to the casing. In this modification the connecter comprises a connecter-body 40 which may be provided with an outstanding flange 42 and an exteriorly screw-threaded inner end-portion 44 by which the connecter may be secured within an opening in the casing 46. The connecter-body 40 is provided with a passage therethrough which is adapted snugly to receive the insulating sheath 12 of the cable but is not large enough to receive the metallic sheath 14 of the cable.

The connecter-body is provided with an externally screw-threaded outer end-portion 48 upon which a compression-collar 50 is received. Said outer end-portion is formed with an internal recess 52 which is adapted to receive the end of the metallic sheath of the cable. A compression-ring 54 is disposed upon said cable-sheath and is adapted to be forced against the tapered seat 30 of the cable by the compression-collar 50 whereby to lock the cable mechanically and also in a water tight manner to the connecter-body 40. If desired, a disc 60 may be interposed between the compression ring 54 and the collar 50. The wedge-ring 24 and the end of the cable sheath are adapted to bear against the inner wall 58 of the recess 52 in said connecter-body 50 whereby to support the cable against the axial forces thereon incident to the screwing up of the compression collar 50. In this construction the end wall 58 serves the purpose of the compression devices at one end of the tube 18 of Figs. 1 and 2.

In applying the connecter above described to the cable, the compression-ring and compression-collar is first slipped on over the end of the cable. The wedge-ring 24 is then forced in between the insulating and metallic sheath of the cable to form the tapered seat 30. The connecter tube 18 may then be slipped over the end of the cable sheath, or the cable may be inserted through the passage in the connecter-body 40, and the compression-collar screwed up.

I claim:

The combination of a pair of juxtaposed metallic-sheathed electric cables having their conductors electrically and mechanically connected, a tube enclosing the juxtaposed and connected ends of said cables having externally screw-threaded ends and internally tapered end-faces into which the sheaths of said cables are extended, a sleeve which is both internally and externally tapered received over the end of the sheath of each cable and seated on each internal face of said enclosing tube, an externally tapered ring received over the insulation of each cable and under the end of each sheath thereof and within each of said sleeves, and clamping nuts threaded on the ends of said tube and bearing on the ends of said sleeves, the connection between the conductors of the cables constituting means to support the cables against lengthwise movement due to the clamping action of said nuts.

In testimony whereof, I have signed my name to this specification.

AUSTIN E. GREENE.